3 Sheets--Sheet 1.

EDWARD JONES.

Improvement in Apparatus for the Manufacture of Illuminating Gas.

No. 4,800. Reissued March 12, 1872.

Witnesses:
F. Gibbs
E. E. Torrey

Inventor.
Edward Jones.
by Wm. Andrew Andrew his atty

AM. PHOTO-LITHOGRAPHIC CO. N.Y. (OSBORNE'S PROCESS.)

3 Sheets--Sheet 2.

EDWARD JONES.

Improvement in Apparatus for the Manufacture of Illuminating Gas.

No. 4,800. Reissued March 12, 1872.

Witnesses:
F. Gilley
E. E. Torrey

Inventor:
Edward Jones.
by Alban Andrew his atty.

AM. PHOTO-LITHOGRAPHIC CO. N.Y. (OSBORNE'S PROCESS.)

EDWARD JONES.

Improvement in Apparatus for the Manufacture of Illuminating Gas.

No. 4,800. Reissued March 12, 1872.

Witnesses:
F. Gilley
E. E. Torrey

Inventor:
Edward Jones.
by Alvan Andrews his atty

AM. PHOTO-LITHOGRAPHIC CO. N.Y. (OSBORNE'S PROCESS.)

UNITED STATES PATENT OFFICE.

EDWARD JONES, OF BOSTON, MASSACHUSETTS, ASSIGNOR TO THE AMERICAN COAL-GAS-LIGHT IMPROVEMENT COMPANY, OF SAME PLACE.

IMPROVEMENT IN APPARATUS FOR THE MANUFACTURE OF ILLUMINATING-GAS.

Specification forming part of Letters Patent No. 116,450, dated June 27, 1871; reissue No. 4,800, dated March 12, 1872.

*To all whom it may concern:*

Be it known that I, EDWARD JONES, of Boston, in the county of Suffolk and State of Massachusetts, have invented a new and useful Improvement in Apparatus for the Manufacture of Coal-Gas, of which the following is a full, clear, and exact description, reference being had to the accompanying drawing making part of this specification, in which—

Figure 1:
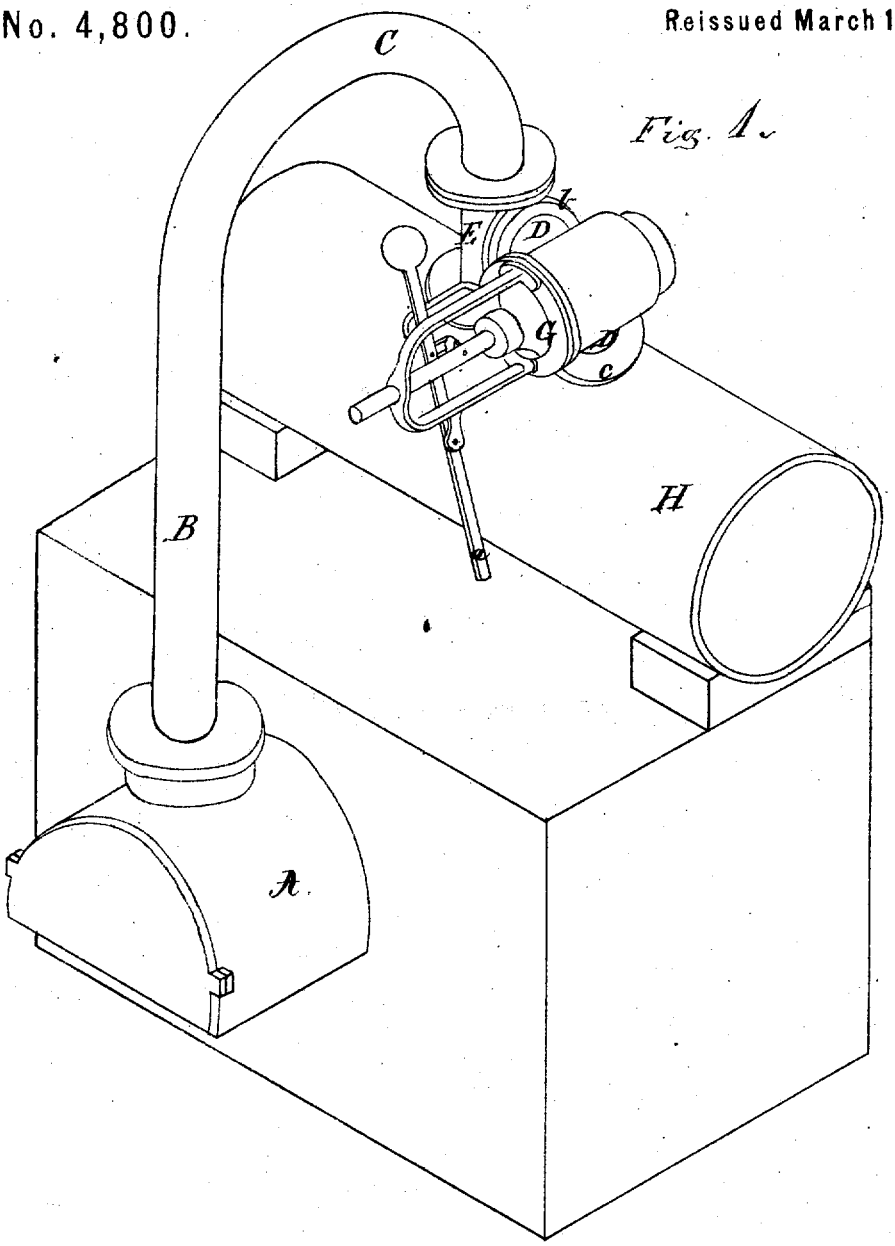
Figure 2:
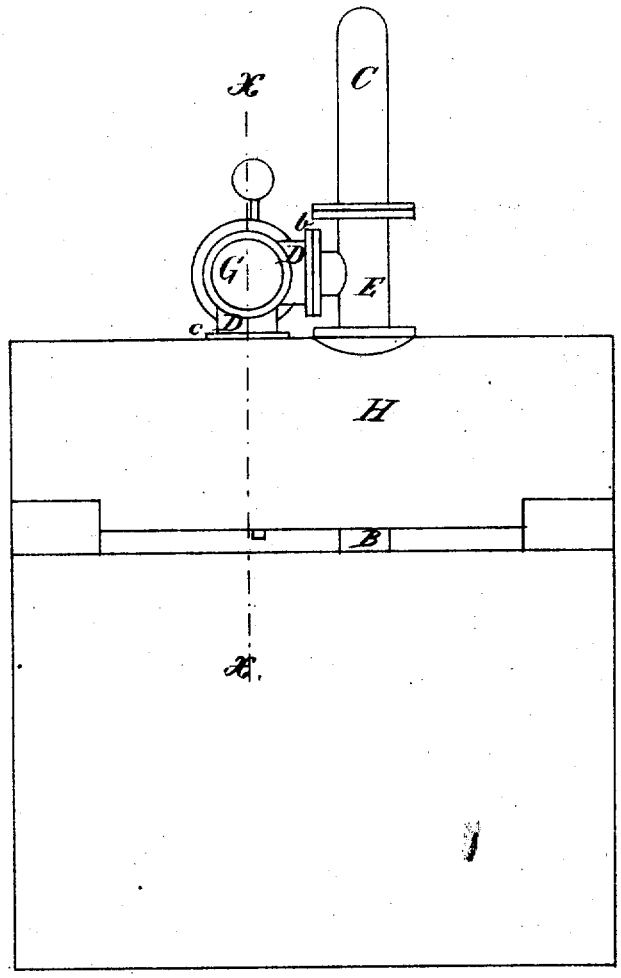
Figure 4:
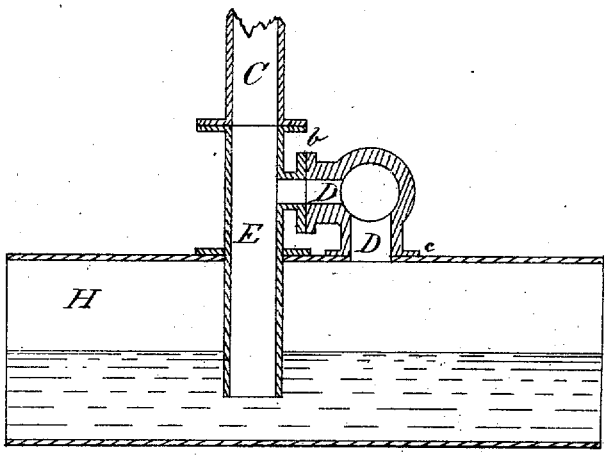
Figure 3:
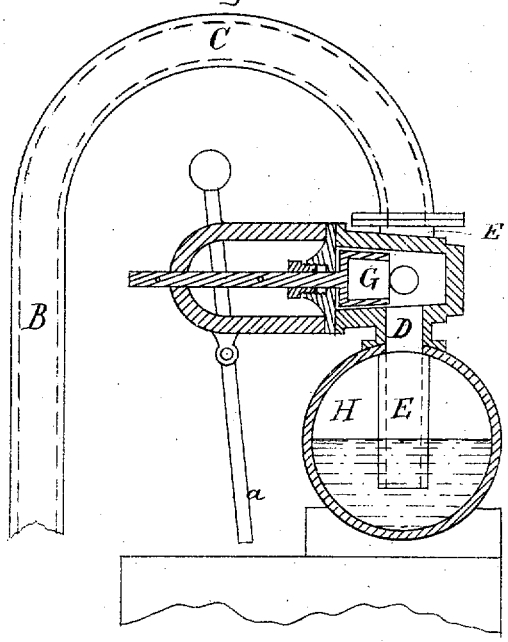

Figure 1 is a perspective view of the apparatus complete. Fig. 2 is a rear elevation of the same. Fig. 3 is a transverse vertical section on the line *x x* of Fig. 2. Fig. 4 is a longitudinal vertical section through the hydraulic main and pipes immediately connected therewith.

The method commonly employed in gas-works of cutting off communication between the retort and the hydraulic main during the drawing of the charge is by means of a "dip-pipe," descending into and sealed by the liquid contents of the main. When these dip-pipes are used, however, the pressure under which the gas is made checks and diminishes its production and hastens the accumulation of fixed carbon in the retorts, which thus accelerates their destruction. To overcome these objections gas apparatus have been constructed in which dip-pipes are dispensed with, and the retorts operated without pressure by the introduction of a valve at some convenient point between the retort and the hydraulic main, the said valve, when closed, effectually shutting off communication, (as required when the retorts is to be charged,) and when open allowing the free production and flow of the gas into the hydraulic main. This apparatus, although it produced the most advantageous results by increasing the production of gas from a given quantity of coal, and retarding the accumulation of fixed carbon within the retorts, was, nevertheless, liable to the objection that, in case the person in charge neglected to open the valve at the commencement of the generation of the gas, the pressure within the retort would cause the "luting" to be blown out; and if the valve was still permitted to remain closed, it would endanger the safety of the works.

My invention has for its object to remove these difficulties; and consists in a gas apparatus having two outlet-pipes for conducting the gas from the retort into a main or receiver, one of these pipes being provided with a valve or cut-off, which, when open, will allow the gas to flow freely to the desired point, the other pipe extending down into the hydraulic main to a sufficient distance to form an ordinary dip-pipe, which is sealed by the liquid contents of the main; by which arrangement, when the valve or cut-off is open the gas will flow freely and without pressure to the desired point, while, if the valve or cut-off is allowed to remain closed, through negligence, during the production of the gas, it will pass through the dip-pipe into the hydraulic main in the ordinary way, thus effectually guarding against and preventing the slightest possibility of an accident, as the gas can pass at all times from the retort by one or the other of the outlet-pipes, whether the valve or cut-off is open or closed.

To enable others skilled in the art to understand and use my invention, I will proceed to describe the manner in which I have carried it out.

In the said drawing, A represents an ordinary retort, from which rises the stand-pipe B leading to the bridge-pipe C. D E are two outlet-pipes, which are connected with the bridge-pipe C. One of these pipes, D, which is provided with a valve or cut-off, G, merely communicates with the hydraulic main H without descending into it, while the other pipe E extends down into the main H, forming a dip-pipe, which is sealed in the liquid contents of the main, as seen in Fig. 4.

When it is desired to draw the charge from the retort A the valve G is closed by means of the lever *a*, which effectually cuts off communication between the retort and the hydraulic main H through the pipe D, while the gas cannot flow back to the retort through the pipe E, as its lower end is sealed in the liquid contents of the main. As soon as the retort has been charged the valve G is opened, which allows the gas to flow freely and without pressure through the outlet-pipe E into the main H in the ordinary way, thereby effectually preventing all danger of explosion or accident.

Any suitable valve or cut-off may be applied to the pipe D, and instead of leading the pipe D into the hydraulic main it may be led directly to the point to which it is desired to conduct the gas without departing from the spirit of my invention, the principle of which consists in providing a means for conducting the gas from the retort to the desired point at all times, whether the valve G is open or closed.

As the valve G is situated outside the main it can easily be reached for repairs; and in case it should become necessary to temporarily remove the pipe D, with its valve, suitable caps can be applied at the points *b c*, and the gas allowed to pass through the dip-pipe into the hydraulic main in the usual manner, thus avoiding delay and inconvenience.

What I claim as my invention, and desire to secure by Letters Patent, is—

In apparatus for producing gas from coal, the combination of the hydraulic main H, the dip-pipe E, and valve-pipe D, or its equivalents when open, enabling the gas to be produced in the retort without pressure; the dip-pipe E, or its equivalent when the valve-pipe D is closed, enabling any gas contained in the retort to escape therefrom whenever it reaches a pressure higher than that of the dip-seal.

EDWARD JONES.

Witnesses:

JOHN L. TUCKER,

JOSEPH W. BEATTEY.